United States Patent [19]

La Barre et al.

[11] Patent Number: 4,583,660

[45] Date of Patent: Apr. 22, 1986

[54] VIBRATORY TONER DISPENSING SYSTEM

[75] Inventors: Marcus A. La Barre; Jeffrey L. Trask; Roger D. Archibald, all of Boise, Id.

[73] Assignee: Hewlett-Packard Company, Palo Alto, Calif.

[21] Appl. No.: 423,892

[22] Filed: Sep. 27, 1982

[51] Int. Cl.[4] .................... B65G 27/32

[52] U.S. Cl. .................... 222/1; 222/161; 222/200; 222/DIG. 1

[58] Field of Search .................... 222/196, 161, 163, 198, 222/200, 564, 547, 55, DIG. 1, 1

[56] References Cited

U.S. PATENT DOCUMENTS

| | | | |
|---|---|---|---|
| 2,910,964 | 11/1959 | Stavrakis et al. | 118/637 |
| 3,078,015 | 2/1963 | Wahl | 222/161 |
| 3,134,849 | 5/1964 | Frohbach et al. | 178/5.2 |
| 3,138,296 | 6/1964 | Neihardt | 222/564 X |
| 3,472,431 | 10/1969 | Bodine, Jr. | 222/196 |
| 3,700,142 | 10/1972 | Waibel | 222/200 X |
| 4,069,791 | 1/1978 | Tobias | 118/120 |
| 4,207,005 | 6/1980 | Stanfield | 222/196 X |
| 4,298,168 | 11/1981 | Rozmus | 239/659 |
| 4,414,916 | 11/1983 | Martin | 222/161 X |

OTHER PUBLICATIONS

Meriovitch, L., Elements of Vibration Analysis, McGraw-Hill, N.Y. (1975), pp. 39–48.

*Primary Examiner*—Charles A. Marmor
*Attorney, Agent, or Firm*—Leslie G. Murray

[57] ABSTRACT

An apparatus and method is disclosed to facilitate the dispensing of powders, particularly toner in a photocopy machine, which must be vibrated to prevent clumping. A powder container is shown with a unique neck baffle, and sloping sides so that the flow of powder is substantially regular when the vibration is turned on and the flow will stop when the vibration is turned off. A method and apparatus for adjusting the natural frequency of the container system is shown so that the amplitude of vibration does not significantly increase as the dispenser is emptied and the flow of powder is thereby maintained at a relatively constant rate.

4 Claims, 4 Drawing Figures

VIBRATORY TONER DISPENSING SYSTEM

BACKGROUND

Many methods have been devised to facilitate the dispensing of dry powder, such as toner used in photocopiers. A chief problem addressed in the prior art is that such powders tend to clump together with the result that the toner cannot be uniformly and predictably dispensed. The solution often used is to agitate the toner which breaks down the clumps and maintains the powder as finely divided particles which will flow like a fluid down an inclined plane. The use of funnel shaped vibrating containers in this manner to facilitate the dispensing of agitated powders is shown for example by Frohbach, et al., in U.S. Pat. No. 3,134,849 issued May 26, 1964 and Stavrakis, et al., in U.S. Pat. No. 2,910,964 issued Nov. 3, 1959. A modified funnel shaped container wherein one side of the container is sloped and one side of the container is vertical has been shown by Tobias in U.S. Pat. No. 4,069,791 issued Jan. 24, 1978. Unfortunately in such modified containers the agitated powder tends to fall irregularly down the vertical side as powder is dispensed.

The devices of Frohbach, et al., Stavrakis, et al., and Tobias use relatively low frequency (60 cps) vibrators such as solenoids to vibrate their toner containers. The suggestion that the use of higher frequencies to drive the toner dispenser might have some utility by producing more finely divided powders was made made by Rozmus in U.S. Pat. No. 4,298,168, column 6, lines 3-7, issued Nov. 3, 1981. Thus, the flow of powder out of a dispenser or down an inclined plane is sensitive to the vibrating frequency of the dispenser or plane. Below a certain frequency depending on the precise physical characteristics of the powder it is very hard to prevent packing and clumping and make the toner behave as a fluid and flow at all. However, it has also been found that above a certain frequency the powder becomes so agitated that clouds of dust are created, and the toner again ceases to behave as a fluid. Thus, for any given toner dispensing system there is a range of values for vibrating the powder so as to make the toner behave as a fluid.

Besides merely making the powder behave as a fluid, it is also desirable that the toner be dispensed at a relatively constant rate. In addition, it is also desirable to spring mount the vibrated dispensing system so that the mechanical vibrations will not be transmitted to adjacent mechanisms. Unfortunately, it has been found that if such a spring mounted dispensing system is driven at higher frequencies above 60 cps in order to create more finely divided powders but still not yet high enough to create clouds of dust, the result is that a substantial change in the flow rate of the toner occurs as it is dispensed and the dispenser empties.

SUMMARY

The present invention consists of an apparatus for preventing the irregular fall of powder when one side of the container is at an angle greater than the angle of repose for non-flowing powder and a method and apparatus for a system for maintaining the constant flow rate of powder dispenser while at the same time permitting the independent selection of the vibrating frequency.

To prevent the irregular fall of the powder a novel neck and baffle for the powder container are disclosed. Both the neck and baffle are set at specified angles with respect to the horizontal plane so that a regular flow of powder can be maintained when the container is vibrated, while at the same time the flow of powder will stop when the vibration is stopped.

To maintain a relatively constant flow rate of powder the desired vibrating frequency is selected to insure a finely divided fluid-like powder. Then the spring stiffness of the vibrating mount is adjusted when the container is full so that the natural frequency of vibration of the dispenser system is equal to or greater than the selected vibrating frequency. The amplitude of vibration of the dispenser will then not increase significantly as the container empties and the natural frequency of vibration increases. Thus, the flow of powder will remain relatively constant since the flow rate is not significantly affected by small changes in vibration amplitude.

DETAILED DESCRIPTION OF THE INVENTION

Figure 1B:
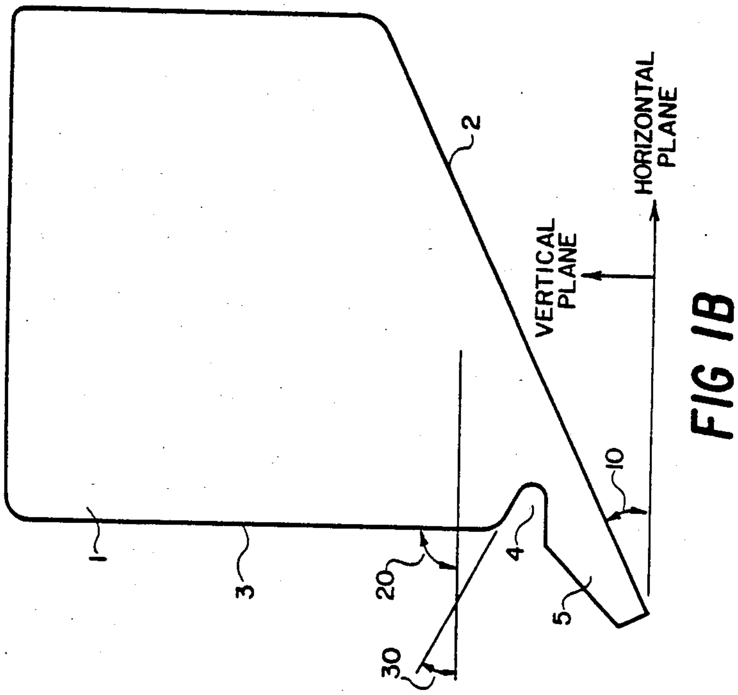
FIGS. 1A and 1B show a front view and side view of a powder container with a baffle for preventing the irregular dispensing of powder according to the preferred embodiment of the present invention.
Figure 1A:
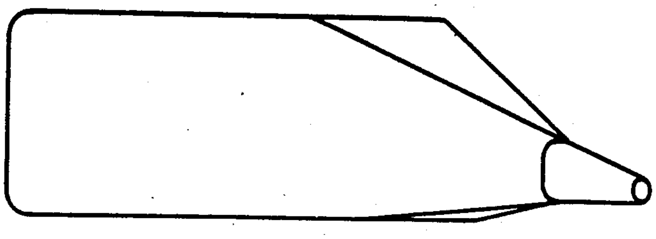

FIGS. 1A and 1B show a container 1 for dispensing a powder with one sloped bottom wall 2, one vertical side wall 3 and a baffle 4 in the vertical side wall 3 for preventing the irregular dispensing of the powder.

It is necessary that the angle 10 of the sloped bottom wall 2 be less than the angle of repose for the powder when the container is not vibrated so that the powder will not be dispensed when the vibrator is turned off yet great enough so that powder will "flow" down the slope when the vibrator is turned on. For a typical toner used in photocopiers this range of angles 10 is between 15 degrees and 40 degrees. Note that the angle of repose for a powder is the maximum angle with respect to the horizontal plane that a powder can be piled up to so that the pile will be stable. Because of the existence of the neck 5 as a continuation of bottom wall 2 it is also possible to have a side wall 3, where angle 20 is greater than the angle of repose, and at the same time the powder will not be dispensed when the vibrator is turned off. However, when the vibrator is turned on and powder is dispensed, powder will tend to forcefully cascade down the side wall 3 and be dispensed in an irregular fashion. By the addition of baffle 4 near the bottom of side wall 3, for example at the entrance of the neck 5, this irregular flow can be greatly reduced, since baffle 4 in effect lengthens the neck 5 and creates a localized cone with two sloped side walls without unduly restricting the size of neck 5 or reducing the overall volume of the container 1. For the same reasons stated above in the selection of angle 10, the baffle 4 should have an upper angle 30 where it intersects side wall 3 within the same range of angles as chosen for angle 10.

Figure 2:
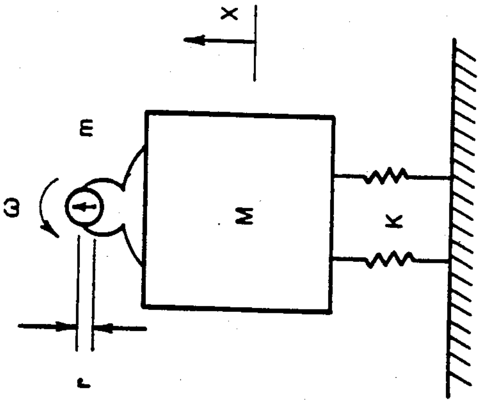
FIG. 2 is a mathematical model of an eccentrically driven spring mass system used to model a spring mounted vibrated powder dispenser.

The spring mounted agitated toner container can be modeled as an eccentric driven spring mass system where a motor driven eccentric or other equivalent means is used to supply the necessary vibration and the container is free to move on its spring mounting. The frequency response of such a driven system is explained by Meirovitch, L., in *Elements of Vibration Analysis,* McGraw-Hill, N.Y. 1975, p. 39–48 for a fixed mass system as shown in FIG. 2 where M is the mass of the dispenser system, m is the mass of the eccentric vibrator, r is the eccentricity of the vibrator, $\omega$ is the driving frequency, $\omega_n$ is the natural frequency of the system, and X is the response amplitude of the system mass M. The non-dimensional response ratio of this system is:

$$MX/mr=(\omega/\omega_n)^2\,|H(\omega)|, \tag{1}$$

where the magnification factor is:

$$|H(\omega)| = \frac{1}{\left\{\left[1-\left(\frac{\omega}{\omega_n}\right)^2\right]^2+\left[2\xi\left(\frac{\omega}{\omega_n}\right)^2\right\}^{\frac{1}{2}}}, \tag{2}$$

where $\xi$ is the damping ratio of the mechanical system. However, the Meirovitch analysis is developed for a fixed mass system with a changing damping ratio. On the other hand, if the damping ratio is fixed, for example, equal to 0.3 and all other parameters other than the frequency are held constant, the response is inversely proportional to the mass M and can be plotted for various multiples (1x–6x) of the response ratio as shown in FIG. 3.

Figure 3:
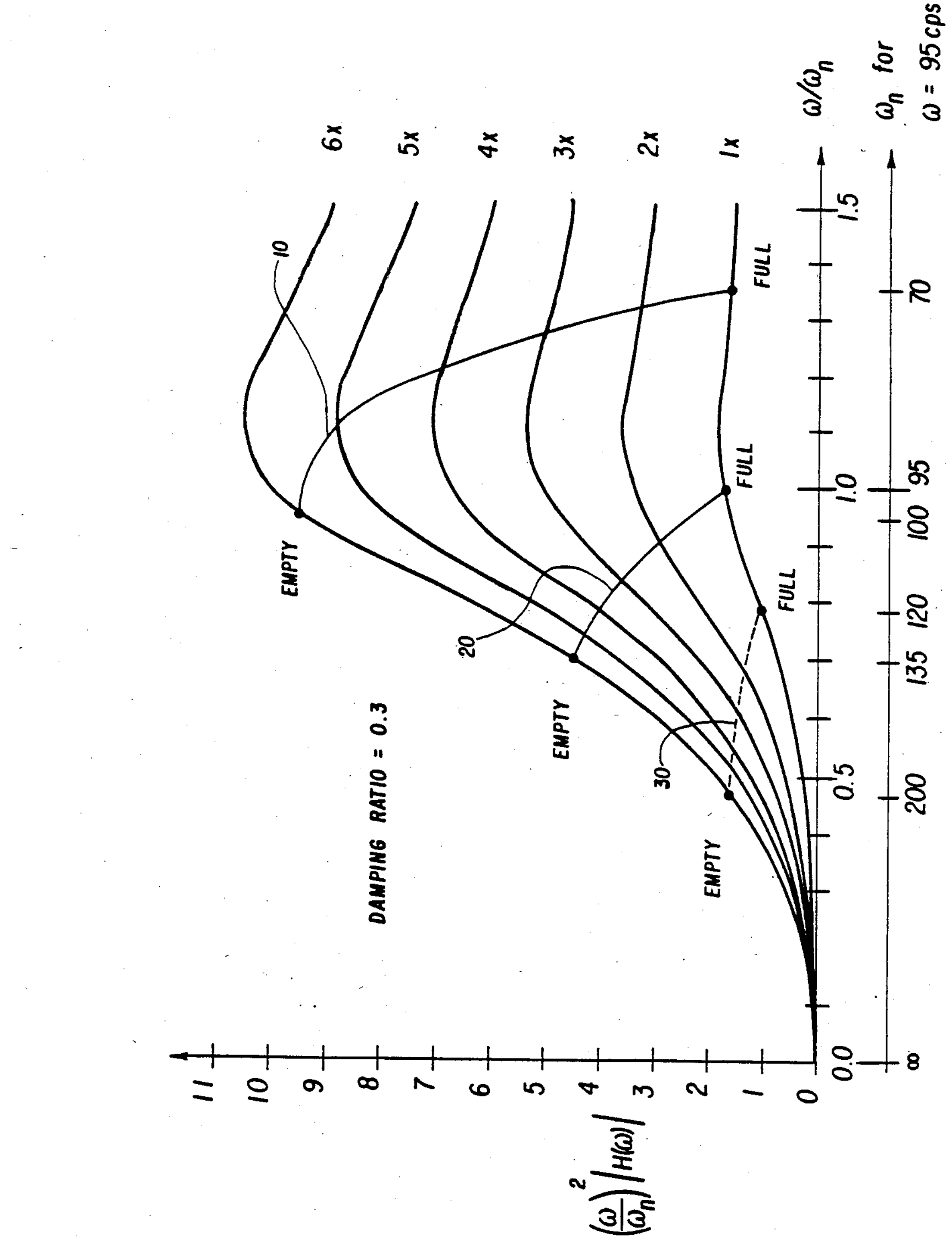
FIG. 3 is a graph of various multiples of the non-dimensional response ratios for the systems of FIG. 2 as the vibrated powder is dispensed.

To utilize FIG. 3 it must be understood that for a given type of container the amplitude of vibration has to be great enough to prevent packing. When the container is full more energy is required to maintain the toner in its desired fluid-like state than when the container is empty. In addition, once the toner has started to flow, the flow rate is not affected by small changes in vibration amplitude. However, large changes in amplitude will cause the flow rate to increase. Thus, by examining FIG. 3 it can be seen why the toner flow rate changes as it is dispensed when the driving frequency is increased higher and higher to create a more finely divided powder.

As toner flows out of the dispenser, the mass of the container decreases, causing the natural frequency of vibration of the container system to increase. If the driving frequency is increased so as to exceed the natural frequency of the system, as the toner is drained from the dispenser the resulting increase in the natural frequency of vibration of the dispenser system will cause the amplitude of vibration to greatly increase as shown by line 10 in FIG. 3. Such a large increase in the vibration amplitude then causes the flow rate of toner to increase. This is true whenever the driving frequency is greater than the system natural frequency.

The way to solve this increasing flow rate as the toner is dispensed when the drive frequency is increased to insure the fluid-like nature of the toner is to raise the natural frequency of the dispenser system above the frequency of the vibrator when the dispenser is full as shown by line 20 in FIG. 2. Since the response curves of FIG. 3 trail off rapidly when $\omega/\omega_n<1$, the increase in response amplitude as the mass M decreases can be significantly reduced.

Thus, in accordance with the disclosed way of choosing the drive frequency and the natural frequency of the dispenser both optimum drive frequency to maintain a fluid-like powder and a substantially constant flow rate of toner can be simultaneously maintained.

The operation of the disclosed apparatus and method is illustrated by a vibrated toner dispenser for a photocopy machine wherein it is desired that the toner be dispensed uniformly over a period of several minutes or hours. In such a dispenser system, for example, the mass subject to vibration is 0.6 kilograms when the dispenser is full and 0.1 kilograms when the dispenser is empty. This is a decrease in mass by a factor of six, shown in FIG. 3 by going from the 1x curve when the dispener is "full" to the 6x curve when the dispenser is "empty." The optimum drive frequency can then be determined when the dispenser is full so that the toner particles are finely divided and no clumps are present. In one such system, the optimum drive frequency has been found to be approximately 95 cps, which is significantly above the 60 cps vibration rate used by most earlier devices. The natural frequency of vibration of the dispenser system is then measured when the dispenser is full by any commonly known method such as measuring the impulse response of the dispenser. In the typical configuration mentioned earlier the initial natural frequency of the vibrating mount when the dispenser was full was measured as 70 cps and 100 cps when the dispenser was empty. The response ratio for this typical configuration is shown as curve 10 in FIG. 3 and the flow rate of toner will increase as the powder is dispensed as explained above. The vibrating mount can now be stiffened to increase its natural frequency until the natural frequency when the bottle is full reaches or exceeds the drive frequency (95 cps in the present example). The response ratio will then follow curve 20 in FIG. 3 and yield a relatively constant discharge rate for the toner.

The dispenser system natural frequency can be further adjusted as shown by curve 30 in FIG. 3 to yield an even more constant response ratio and more uniform flow rate as the toner dispenser is emptied. However, as the natural frequency is adjusted further and further away from the drive frequency the efficiency of energy transfer between the vibrator and the dispenser falls requiring higher drive amplitude, r, to maintain the powder in a fluid-like state. The practical result is that for reasonable energy transfer it is necessary to keep the drive frequency $\omega$ between 0.7 and 1.0 times the natural frequency of vibration ($0.7\ \omega_n<\omega<1.0\ \omega_n$) when the container is full.

We claim:

1. Apparatus for dispensing a powder at a substantially constant rate, said apparatus comprising:
   - container means having substantially lower mass than the powder, and having a bottom inclined at less than the angle of repose of the powder, for containing the powder;
   - agitation means for agitating the container means and the powder container therein, said container means, powder contained therein and agitation means in combination having a natural frequency of vibration substantially determined by the mass of the powder contained therein;
   - said agitation means being effective for agitating the container means and the powder contained therein at a driving frequency equal to or less than the natural frequency of said combination when the container means is full of powder; and
   - said agitation means includes adjustable mounting means for mounting the container means and for adjusting the natural frequency of said combination to a value equal to or greater than the driving frequency.

2. A method of dispensing powder at a substantially constant rate from a dispensing system, said dispensing system including container and agitation means, said powder contained in said container means, container and agitation means combination having a natural frequency of vibration substantially determined by the mass of the powder contained therein, said method comprising the steps of:

containing the powder in container means having substantially lower mass than the powder and having a bottom inclined at an angle less than the angle of repose of the powder;

agitating the container means and the powder contained therein at a frequency equal to or less than the natural frequency of vibration of said combination; and adjusting the natural frequency of said combination to a value equal to or greater than the driving frequency.

3. A method as in claim 2 wherein the step of adjusting the natural frequency of the combination includes the step of off-setting the tendency of the amplitude of agitation of the combination to increase as the mass of the combination decreases against the tendency of the amplitude of agitation of the combination to decreases as the natural frequency of the combination deviates from the driving frequency.

4. A method as in claim 3 wherein the natural frequency of vibration is adjusting when the container is full to a value no greater than 1.5 times the driving frequency.

* * * * *

UNITED STATES PATENT AND TRADEMARK OFFICE
CERTIFICATE OF CORRECTION

PATENT NO. : 4,583,660
DATED : April 22, 1986
INVENTOR(S) : Marcus A. LaBarre et al It is certified that error appears in the above-identified patent and that said Letters Patent is hereby corrected as shown below:

Column 1, line 64 of the Patent, after "powder", insert --from a powder--.

In Claim 4, column 6, line 15 of the Patent, delete "adjusting", insert --adjusted--.

Signed and Sealed this

Thirteenth Day of January, 1987

*Attest:*

DONALD J. QUIGG

*Attesting Officer* — *Commissioner of Patents and Trademarks*